US008923271B2

(12) United States Patent
Wang et al.

(10) Patent No.: US 8,923,271 B2
(45) Date of Patent: Dec. 30, 2014

(54) METHODS AND ARRANGEMENTS IN A WIRELESS COMMUNICATION SYSTEM

(75) Inventors: Min Wang, Luleå (SE); Erik Eriksson, Linköping (SE); Jonas Pettersson, Luleå (SE); Kristofer Sandlund, Luleå (SE); Ylva Timner, Luleå (SE); Mats Wernersson, Luleå (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 216 days.

(21) Appl. No.: 13/519,061

(22) PCT Filed: Jan. 13, 2010

(86) PCT No.: PCT/SE2010/050021
§ 371 (c)(1),
(2), (4) Date: Jun. 25, 2012

(87) PCT Pub. No.: WO2011/087406
PCT Pub. Date: Jul. 21, 2011

(65) Prior Publication Data
US 2012/0269154 A1 Oct. 25, 2012

(51) Int. Cl.
| | |
|---|---|
| H04B 7/212 | (2006.01) |
| H04W 72/12 | (2009.01) |
| H04L 29/08 | (2006.01) |
| H04L 29/06 | (2006.01) |
| H04L 12/40 | (2006.01) |

(52) U.S. Cl.
CPC ...... *H04W 72/1284* (2013.01); *H04W 72/1242* (2013.01); *H04L 29/08954* (2013.01); *H04L 29/06523* (2013.01); *H04L 12/40143* (2013.01); *H04L 12/4015* (2013.01)
USPC ............................ 370/348; 370/329; 370/341

(58) Field of Classification Search
CPC ........... H04W 4/20; H04W 8/22; H04W 8/24; H04W 8/245; H04L 12/40413; H04L 12/4015; H04L 29/06523; H04L 29/08954
USPC ......... 370/324, 350, 455, 458, 496, 348, 341, 370/329
See application file for complete search history.

(56) References Cited

U.S. PATENT DOCUMENTS 6,493,331 B1 * 12/2002 Walton et al. ................. 370/341
6,985,462 B2 * 1/2006 Hosein .......................... 370/329
(Continued)

FOREIGN PATENT DOCUMENTS

| EP | 1 643 690 A1 | 4/2006 |
|---|---|---|
| WO | WO 2008/156402 A1 | 12/2008 |

OTHER PUBLICATIONS

International Search Report and Written Opinion of the International Searching Authority, International Application No. PCT/SE2010/050021, Oct. 26, 2010.

(Continued)

Primary Examiner — Ricky Ngo
Assistant Examiner — Dewanda Samuel
(74) Attorney, Agent, or Firm — Myers Bigel Sibley & Sajovec, PA

(57) ABSTRACT

Method and arrangement in a base station for allocating resources to a user equipment. The method and arrangement comprises analyzing a period of time comprising a subset of the predetermined scheduling request opportunities, detecting a scheduling request from the user equipment, establishing priority level information from the detected scheduling request and the subset of the predetermined scheduling request opportunities, and allocating resources to the user equipment, according to the established priority level information. In addition, a method and arrangement in a user equipment for assisting the base station in allocating resources to the user equipment are described.

23 Claims, 7 Drawing Sheets

(56) References Cited

U.S. PATENT DOCUMENTS

| | | | |
|---|---|---|---|
| 8,437,293 B2* | 5/2013 | Jersenius et al. | 370/329 |
| 8,543,125 B2* | 9/2013 | Susitaival et al. | 370/329 |
| 2007/0201397 A1* | 8/2007 | Zhang | 370/329 |
| 2009/0238165 A1* | 9/2009 | Cai et al. | 370/345 |
| 2010/0080184 A1* | 4/2010 | Tseng | 370/329 |
| 2010/0098011 A1* | 4/2010 | Pelletier et al. | 370/329 |
| 2010/0135233 A1* | 6/2010 | Ono | 370/329 |
| 2012/0033628 A1* | 2/2012 | Eriksson et al. | 370/329 |

OTHER PUBLICATIONS

International Preliminary Report on Patentability, International Application No. PCT/SE2010/050021, Apr. 27, 2012.

Ericsson, "Scheduling request triggering criterions for LTE", 3GPP Draft; R2-074048, vol. RAN WG2, Shanghai, China, Oct. 1, 2007, XP050136683.

Ericsson, "Buffering Reporting for LTE UL", 3GPP Draft, R2-073211, vol. RAN WG2, Athens, Greece, Aug. 14, 2007, XP050135940.

* cited by examiner

METHODS AND ARRANGEMENTS IN A WIRELESS COMMUNICATION SYSTEM

CROSS REFERENCE TO RELATED APPLICATION

This application is a 35 U.S.C. §371 national stage application of PCT International Application No. PCT/SE2010/050021, filed on 13 Jan. 2010, the disclosure and content of which is incorporated by reference herein in its entirety. The above-referenced PCT International Application was published in the English language as International Publication No. WO 2011/087406 A1 on 21 Jul. 2011.

TECHNICAL FIELD

The present invention relates to a method and arrangement in a base station and a method and arrangement in a user equipment. More in particular, it relates to a mechanism for allocating resources within a wireless communication system.

BACKGROUND

In 3rd Generation Partnership Project (3GPP), work is ongoing on specifications of the Universal Mobile Telecommunications System (UMTS) Terrestrial Radio Access Network evolution (UTRAN). This work is frequently referred to as evolved UTRAN (E-UTRAN), as part of the Long Term Evolution (LTE) effort.

In LTE, the scheduler is placed in the eNodeB (eNB) and the Medium Access Control (MAC) layer. The scheduler assigns radio resources, also called Resource Blocks (RB), for the downlink (assignments) as well as for the uplink (grants) using the Physical Downlink Control Channel (PDCCH). Also, information concerning which transport format to use is comprised within the assignment and grant, respectively.

The radio downlink is the transmission path from a base station, e.g. an eNodeB, to a User Equipment (UE). The uplink is the inverse of a downlink, i.e. the transmission path from the user equipment to the base station.

For uplink scheduling, the eNodeB needs information about the current state of the buffers in the user equipment i.e. if and how much data the user equipment has in its priority queues. This information is sent from the user equipment to the eNodeB either as a 1-bit scheduling request (SR) or by a buffer status report (BSR). Buffer status reports are transmitted on a data channel such as Physical Uplink Shared Channel (PUSCH), mostly together with user data. Before access to the data channel is granted, scheduling requests are transmitted on a control channel such as e.g. Physical Uplink Control Channel (PUCCH) or Random Access Channel (RACH). If the user equipment has a valid PUCCH resource for scheduling request configured in any Transmission Time Interval (TTI) it sends a one bit scheduling request when the timing is right.

Scheduling requests may either be transmitted on the RACH channel (RA-SR) or on dedicated resources on the PUCCH (Dedicated SR, D-SR) if such resources are available. The PUCCH resources for dedicated SR are assigned and revoked by the eNodeB through Radio Resource Control (RRC). In addition, the resources are autonomously revoked when the user equipment looses uplink synchronization.

A dedicated scheduling request is typically used when the user equipment uplink is time synchronized. The purpose is to enable user equipment to rapidly request resources for uplink data transmission. In 3GPP, a dedicated solution for the scheduling request has been agreed on. For the dedicated approach, each active user is assigned a dedicated channel for performing the scheduling request. The benefit with this method is that no user equipment identity has to be transmitted explicitly, since the user equipment is identified by the channel used. Furthermore, no intra-cell collisions will occur in contrast to the contention based approach.

Precise and up-to-date scheduling information allows more accurate scheduling decisions, and can help to optimize the use of radio resources and to improve capacity. However, the accuracy of the information provided by the user equipment is limited by the granularity of the buffer status reports, by the frequency of the scheduling requests and buffer status report transmissions and by the delay between the reception of the scheduling requests or buffer status report and the scheduling decision.

For delay sensitive services with periodical packet arrival, such as Voice over the Internet Protocol (VoIP), the likelihood that the buffer status information is outdated when it is used is high. It is likely that additional data has arrived since the buffer status report was transmitted. It is also likely that the buffer will be emptied frequently and therefore the only available information will be a one bit scheduling request. With only a 1-bit indication from the user equipment, it is impossible for the eNodeB to know what kind of data that has arrived in the user equipment's buffer. This means further that the eNodeB scheduler might not be able to prioritize important data, such as handover signalling messages, even though this data is associated with a Quality of Service (QoS) Class Identifier (QCI) of high priority. This will result into an unendurable delay for the important data.

With incorrect uplink information, the scheduler is furthermore likely to provide either a too large grant, which then result in the user equipment transmitting padding and may reduce system capacity, or a too small grant, which may lead to Radio Link Control (RLC) segmentation and an increase in transmission delay.

Buffer status reporting is used by the user equipment to report to the eNodeB the amount of data stored in its buffers for transmission. The eNodeB uses these reports to allocate resources to the user equipment, and to prioritize resource allocation among different user equipments.

The user equipment triggers a regular buffer status report and scheduling request when uplink data becomes available for transmission and if this data belongs to a Logical Channel Group (LCG), or radio bearer group, with higher priority than those for which data already existed in the buffer or if the user equipment buffers were empty just before this new data became available for transmission.

The dedicated scheduling request is repeatedly transmitted on consecutive scheduling request opportunities on PUCCH until the user equipment receives an uplink grant on PDCCH. The transmission is stopped at least when PUCCH resources are released and/or uplink synchronization is lost even if the user equipment has not received any uplink grant on PDCCH. After stopping transmission on the dedicated scheduling request, the user equipment transmits on the random access scheduling request, i.e. accesses the system via RACH.

The random access scheduling request is used when the user equipment has lost uplink synchronization or if it has no dedicated scheduling request resources.

With the current approach in LTE, the eNodeB can with a received scheduling request only determine that the user equipment has new data to be scheduled, without any further knowledge on the amount and type of data available. This means for example that the eNodeB in many cases do not know to what QoS class identifier the available data is related and with what priority it thereby should be treated in scheduling decisions. This can in turn result in that important traffic with high priority is not recognized as such and therefore not treated with the required priority.

In a scenario where a service such as VoIP is used, where the user equipment buffer is typically emptied frequently and the only information for the eNodeB scheduler will be the reception of a 1-bit scheduling request, the scheduler cannot differentiate between the arrival of a VoIP frame and a high priority signalling message related to e.g. handover. Handover signalling messages are important to treat with high priority as the handover signalling is typically triggered when the user equipment experiences bad channel conditions at the cell border and the signalling is therefore urgent to complete. Long scheduling delays may lead to that the user equipment moves further away from the serving cell and into worse channel conditions, possibly leading to that the messages cannot be delivered at all. The handover may therefore fail due to the eNodeB's inability to differentiate VoIP traffic from handover signalling.

Only having a 1-bit scheduling request means further that the eNodeB has no knowledge of the amount of data available in the user equipments buffer. The scheduler can therefore in this case only make a "best guess" when assigning transmission resources, which is likely to lead to suboptimal use of the available resources.

Previously known scheme in LTE for scheduling request transmissions has the following shortcomings:

The only information the reception of a scheduling request gives is that new data is available in the user equipment buffer. It is therefore in many cases impossible for the eNodeB to determine which Logical Channel Group (LCG), and thus also QCI, the data belongs to and with which priority it should be handled. Upon receiving a scheduling request, the eNodeB has no knowledge on the amount of data available in the buffer of the user equipment and it is therefore likely that the assigned transmission resources are not the most optimal. A method for obtaining more information on the user equipment buffer status with the reception of a scheduling request may be useful for improving the scheduling.

SUMMARY

It is the object to obviate at least some of the above disadvantages and provide an improved performance within a wireless communication system.

According to a first aspect, the object is achieved by a method in a base station for allocating resources to a user equipment. The user equipment is served by the base station. The user equipment is configured to transmit scheduling requests to the base station only at certain predetermined scheduling request opportunities. The method comprises analyzing a period of time, comprising a subset of the predetermined scheduling request opportunities. The method also comprises detecting at least one scheduling request, received from the user equipment on at least one scheduling request opportunity within the analyzed period of time. In addition, the method comprises establishing priority level information from the detected at least one scheduling request and the subset of the predetermined scheduling request opportunities comprised within the analyzed period of time. Further, the method comprises allocating resources to the user equipment, according to the established information.

According to a second aspect, the object is also achieved by an arrangement in a base station for allocating resources to a user equipment served by the base station. The user equipment is configured to transmit scheduling requests to the base station only at certain predetermined scheduling request opportunities. The arrangement comprises an analyzer. The analyzer is configured to analyze a period of time, comprising a subset of the predetermined scheduling request opportunities. Further, the arrangement comprises a detector. The detector is configured to detect at least one scheduling request, received from the user equipment on at least one scheduling request opportunity within the analyzed period of time. Also, in addition, the arrangement also comprises an establishing unit. The establishing unit is configured to establish priority level information from the detected at least on scheduling request and the subset of the predetermined scheduling request opportunities comprised within the analyzed period of time. Further, the arrangement also comprises a scheduler. The scheduler is configured to allocate resources to the user equipment, according to the established information.

According to a third aspect, the object is also achieved by a method in a user equipment for assisting a base station in allocating resources to the user equipment. The user equipment is configured to transmit scheduling requests to the base station only at certain predetermined scheduling request opportunities. The method comprises determining priority level information to be transmitted to the base station, by means of transmitting at least one scheduling request at a certain predetermined scheduling request opportunity. Also, the method comprises establishing which certain predetermined scheduling request opportunity to use for transmitting at least one scheduling request to the base station in order to provide the determined priority level information to the base station. Further, the method comprises transmitting the at least one scheduling request to the base station.

According to a fourth aspect, the object is also achieved by an arrangement in a user equipment for assisting a base station in allocating resources to the user equipment, the user equipment is configured to transmit scheduling requests to the base station only at certain predetermined scheduling request opportunities. The arrangement comprises a determining unit. The determining unit configured to determine priority level information to be transmitted to the base station, by means of transmitting at least one scheduling request at a certain predetermined scheduling request opportunity. Also the arrangement comprises an establishing unit. The establishing unit is configured to establish which certain predetermined scheduling request opportunity to use for transmitting at least one scheduling request to the base station in order to provide the determined priority level information to the base station. Furthermore the arrangement comprises a transmitter. The transmitter is configured to transmit the at least one scheduling request to the base station.

Thanks to the present methods and arrangements is it possible to provide the base station with priority level information concerning e.g. which LCG the data in the user equipments buffer relates to, without increasing overhead signaling within the system, when receiving a scheduling request. This means that better scheduling decisions can be done, both in regard to scheduling priority and transport format assignment. The latter is because better estimations on the amount of data in the buffer can be done if the LCG is known.

Further, the overall improved scheduling decisions resulting from the present methods and arrangements render higher capacity and better coverage within the system. Thereby an improved performance in the wireless communication system is provided.

Other objects, advantages and novel features of the invention will become apparent from the following detailed description of the invention.

BRIEF DESCRIPTION OF THE DRAWINGS

The present invention will now be described more in detail in relation to the enclosed drawings, in which.

DETAILED DESCRIPTION

The invention is defined as a method and an arrangement in a base station and as a method and an arrangement in a user equipment, which may be put into practice in the embodiments described below. This invention may, however, be embodied in many different forms and may not be construed as limited to the embodiments set forth herein; rather, these embodiments are provided so that this disclosure will be thorough and complete, and will fully convey the scope of the invention to those skilled in the art. It is to be understood that there is no intent to limit the present methods and/or arrangements to any of the particular forms disclosed, but on the contrary, the present methods and arrangements are to cover all modifications, equivalents, and alternatives falling within the scope of the invention as defined by the claims.

Figure 1:
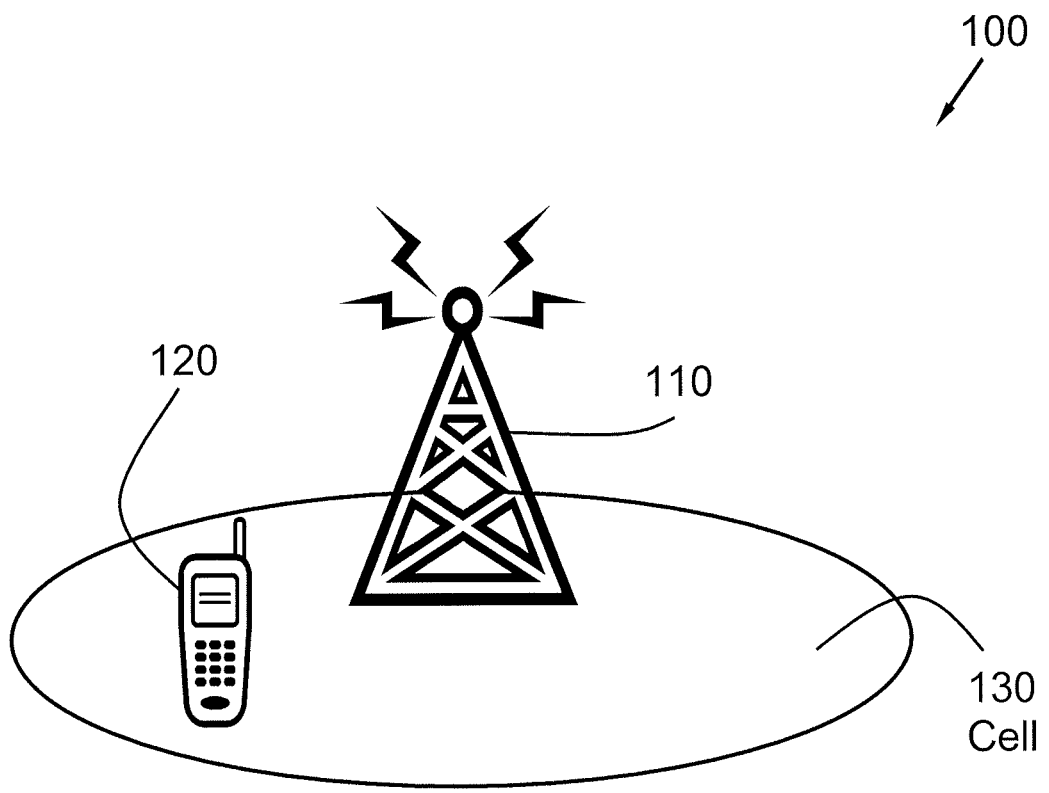
FIG. 1 is a schematic block diagram illustrating a wireless communication system.

FIG. 1 is a schematic illustration over a wireless communication system 100. The wireless communication system 100 comprises at least one base station 110 and is arranged to comprise at least one user equipment 120. The base station 110 may send and receive wireless signals to and from the user equipment 120 situated within a cell 130.

Although only one base station 110 is shown in FIG. 1, it is to be understood that another configuration of base station transceivers may be connected through, for example, other network nodes, to define the wireless communication system 100. Further, the base station 110 may be referred to as e.g. a Remote Radio Unit, an access point, a Node B, an evolved Node B (eNode B) and/or a base transceiver station, a Radio Base Station (RBS), Access Point Base Station, base station router, etc depending e.g. of the radio access technology and terminology used.

In some embodiments, the user equipment 120 may be represented by and/or referred to as a wireless communication device, a wireless communication terminal, a mobile cellular telephone, a terminal, a Personal Communications Systems terminal, a Personal Digital Assistant (PDA), a laptop, computer or any other kind of device configured for wireless communication.

The wireless communication system 100 may be based on technologies such as e.g. Global System for Mobile Telecommunications (GSM), Enhanced Data rates for GSM Evolution (EDGE), General Packet Radio Service (GPRS), Code Division Multiple Access (CDMA), Wideband Code Division Multiple Access (WCDMA), CDMA 2000, High Speed Downlink Packet Data Access (HSDPA), High Speed Uplink Packet Data Access (HSUPA), High Data Rate (HDR) High Speed Packet Data Access (HSPA), Universal Mobile Telecommunications System (UMTS) etc, just to mention some few arbitrary and none limiting examples. Further, as used herein, the wireless communication system 100 may further, according to some embodiments, refer to Wireless Local Area Networks (WLAN), such as Wireless Fidelity (WiFi) and Worldwide Interoperability for Microwave Access (WiMAX), Bluetooth or according to any other wireless communication technology.

However, in the exemplary embodiments in the subsequent description, the wireless communication system 100 is based on LTE.

The user equipment 120 may further communicate with other terminals not shown in FIG. 1, via the base station 110 comprised within the wireless communication system 100.

The user equipment 120 according to the present methods and arrangements make use of the assigned scheduling request when it has a data packet in its transmission buffer.

The basic idea of this invention is to extend the scheduling request transmission framework so that the reception of one or several dedicated scheduling requests from the user equipment 120 indicates more than simply that the user equipment 120 has data that should be scheduled. The additional information can be provided by assigning implication to when and where in time and frequency dedicated scheduling requests are transmitted, as will be further discussed and exemplified in connection with FIGS. 2A-2C. Several dedicated scheduling request transmission positions can be assigned for each user equipment 120 so that the use of a specific subset of them has a specific meaning, such that data belonging to a specific logical channel group set is available in the user equipment buffer. Such additional information may be referred to as priority level information, as it may be used by the base station 110 for determining the priority level of the user equipment transmission to be scheduled.

The objective of the present invention is to give the scheduler, comprised in the base station 110, more information to base scheduling decisions on for a user equipment 120 which has transmitted one or multiple dedicated scheduling requests but not a buffer status report.

With the implementation of this invention, it may be possible to realize a number of different priority level information indications with the transmission of one or several dedicated scheduling requests. In the embodiments described in the subsections below, it is assumed that these "indication realizations" are used to indicate to which logical channel group the highest prioritized data in the user equipment buffer belongs to. As there might be more logical channel groups than different possible indications, a one-to-one mapping between indication and logical channel group can not always be realized. Instead a number of logical channel groups might be mapped to the same indication realization. For example, the highest priority logical channel group might be signalled with one specific indication while the rest are signalled in the same way. Thus the base station 110 may be informed whether the data to schedule needs to be treated with the highest priority or not, according to some embodiments.

In the sections below, these "indication realizations", to which one or several logical channel groups are mapped, are referred to as logical channel group priority levels, or just priority levels.

The exact configuration to be used, i.e. which logical channel groups that may be mapped to which logical channel group priority level, is decided by the base station 110 and signalled to the user equipment 120 by radio resource control signalling.

To specify the proposed invention more clearly, exemplary embodiments are described more in detail below.

Figure 2A:
FIG. 2A is a schematic block diagram illustrating embodiments of method steps in a wireless communication system.

FIG. 2A presents a first embodiment of the present method. With this realization, a user equipment 120 is assigned dedicated scheduling request opportunities t1, t2, t3, t4, t5 with a fixed periodicity. A particular meaning is assigned to when in time the dedicated scheduling request opportunity is used. In FIG. 2A, an example of a realization is shown where the use of every odd dedicated scheduling request transmission opportunity indicates that data belonging to a low priority logical channel group is available in the buffer, while the use of an even scheduling request transmission opportunity means that data for a high priority logical channel group is instead available. Note that this is just one example on how the scheme can be configured. An arbitrary number n of logical channel group priority levels can be realized by assigning a specific priority level indication to every n:th dedicated scheduling request transmission opportunity. The priority level indicator p can then be calculated by applying p=x mod n, where x is the dedicated scheduling request transmission opportunity used, counted from the first after assignment, and n the number of available priority level indicators.

The exact configuration to be used for each user equipment 120, i.e. what priority levels that are available, for which logical channel group they may be used and where they are located may be configured by the base station 110 in the radio resource control.

This embodiment is easy to realize, which means that relatively small changes in the specifications are needed. Also, error cases are the same as with the current scheduling request transmission scheme.

A second embodiment is similar to the first embodiment illustrated in FIG. 2A, except that multiple dedicated scheduling request allocations can be assigned to the user equipment 120, each indicating a specific priority level, or group of priority levels. The dedicated scheduling request allocations can be spread in time with even periodicity, just as shown in FIG. 2A, but as each dedicated scheduling request allocation can be given an individual position and periodicity, the interval between the different dedicated scheduling request allocations can here also be uneven and varying over time. Multiple dedicated scheduling request allocations can even be assigned to sometimes, or always, occur in the same transmission time interval.

This embodiment has an in particular simple realization, which means that relatively small changes in the specifications are needed. Also, error cases are the same as with the current scheduling request transmission scheme.

Another advantage of the present embodiment is the flexibility in the periodicity and positions of dedicated scheduling request allocation per priority level. A high priority dedicated scheduling request allocation may for example be given with high frequency, thus assuring short scheduling request delays, while an allocation for lower priority data may have longer intervals to lower the load on PUCCH.

Figure 2B:
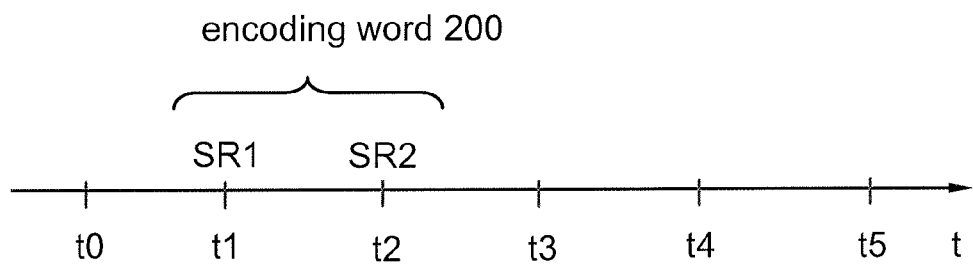
FIG. 2B is a schematic block diagram illustrating embodiments of method steps in a wireless communication system.

FIG. 2B illustrates a third embodiment of the present method in a base station 110. Consecutive dedicated scheduling request transmission opportunities t1, t2, t3, t4, t5 may be grouped to form an encoding word, based on what subset of this group is used by the user equipment 120 for scheduling request SR transmission. An illustrative example of this is shown in FIG. 2B, where dedicated scheduling request slots are paired to enable the possibility to form two-bit words, indicating a logical channel group priority level for the available data in the buffer.

Having two consecutive dedicated scheduling requests SR-1, SR-2 forming an encoding word, as in FIG. 2B, allows for indicating three different priority levels as is exemplified in Table 1. In this table, a "1" annotates the transmission of a scheduling request SR while "0" indicates DTX, or no scheduling request SR transmission. Note that the fourth combination of two consecutive DTX detections cannot be used for a fourth priority level as it only indicates that no data has arrived that requires the transmission of a scheduling request SR.

| Priority level | D-SR1 | D-SR2 |
|---|---|---|
| Highest priority | 1 | 1 |
| Medium priority | 1 | 0 |
| Lowest priority | 0 | 1 |

The highest priority level may be indicated with the transmission of scheduling requests SR on all dedicated scheduling requests slots of the encoding word, as in Table 1. If more than two dedicated scheduling request slots per encoding word are used, the number of scheduling request transmissions in the word may be decreasing with decreasing priority, according to some embodiments. This to ensure that the error case of missing all scheduling request transmissions of a word, and thus interpreting it as the user equipment 120 do not need to be scheduled, becomes less likely the higher priority of the data. If only a subset of the transmitted scheduling requests SR is missed, the misinterpretation by the base station 110 may be that data of less priority is available, according to some embodiments.

It may be possible to group an arbitrary number of dedicated scheduling request transmission opportunities t1, t2, t3, t4, t5 in order to obtain longer encoding words and thus a larger number of different priority levels. With n consecutive dedicated scheduling request slots grouped, it is possible to indicate 2n−1 priority levels.

With a combination of the second and the third embodiment it may be possible to place the dedicated scheduling request resources corresponding to one encoding word in consecutive TTIs, reducing the latency until the base station 110 receives the exact priority information, according to some embodiments.

As the highest logical channel group priority level is mapped to the "encoding word" with most scheduling request transmissions, the error case of completely missing the scheduling request transmission sequence becomes the lowest for high priority data, according to some embodiments.

Figure 2C:
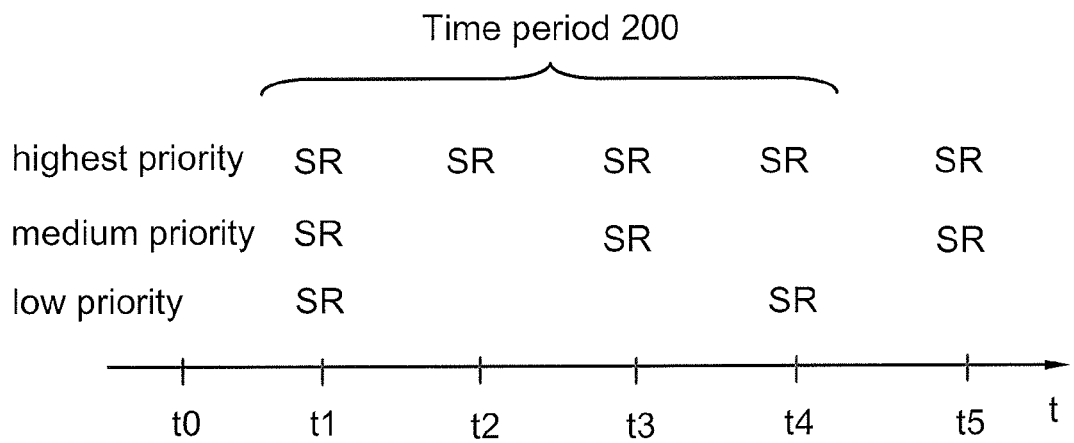
FIG. 2C is a schematic block diagram illustrating embodiments of method steps in a wireless communication system.

FIG. 2C illustrates a fourth embodiment of the present method in a base station 110. In this exemplary embodiment, the dedicated scheduling request repetition frequency is used as a logical channel group priority level indicator. In the example of FIG. 2C, three different priority levels are used.

The repetition frequency of every opportunity t1, t2, t3, t4, t5 means that data of the highest priority level is available. Repetition every second opportunity t1, t3, t5 indicates a medium level and having repetitions at every third transmission opportunity t1, t4, may indicate the lowest priority.

In contrast to the above described embodiments, the dedicated scheduling request transmission opportunities t1, t2, t3, t4, t5 are here not grouped together in a specific way and the first scheduling request SR can here always be transmitted at the first dedicated scheduling request opportunity t1, t2, t3, t4, t5 occurring after a scheduling request event is triggered. The priority is then defined by the following repetitions of the scheduling request SR. It may be noted that according to this embodiment, after receiving the first scheduling request SR, the base station 110 has as much information as is available with the previously known scheduling request scheme, after receiving a scheduling request SR. The base station 110 may thus schedule the user equipment 120 directly after the first reception if resources are available. However, if resources are not available to schedule the user equipment 120 immediately, the base station 110 may obtain more priority level information after the second dedicated scheduling request opportunity t2. If a repetition is then detected, the data belongs to the highest priority level. Otherwise the data is of second highest priority or lower. Similarly, after the third scheduling request transmission opportunity t3 it will be known to the scheduler whether the data is of the third highest level of priority or lower, and so on. This means that the most important information is made available to the base station 110 first.

Thanks to this embodiment, the scheduling request delay may be the same as with the previously known scheme in low load situations, as scheduling may be done immediately after reception of the first scheduling request SR.

Further, the lowest number of scheduling request retransmissions has to be received to know that the data relates to the highest priority level. This means lowest delays for the most important data.

Also, the error case of missing some of the scheduling request (re-)transmissions leads only to that the data is mistaken for being of less priority or realized slightly later to be of the correct priority.

In addition, the scheduling request signalling for the highest priority levels is the least error case sensitive, due to the highest retransmission frequency.

In order to grant a particular user equipment 120 access to a particular uplink resource, a grant is generated and sent from the base station 110 to that particular user equipment 120, based on the estimated priority of the data to be transmitted, as will be further explained and discussed more in detail in connection with the presentation of FIGS. 3-7.

Figure 3:
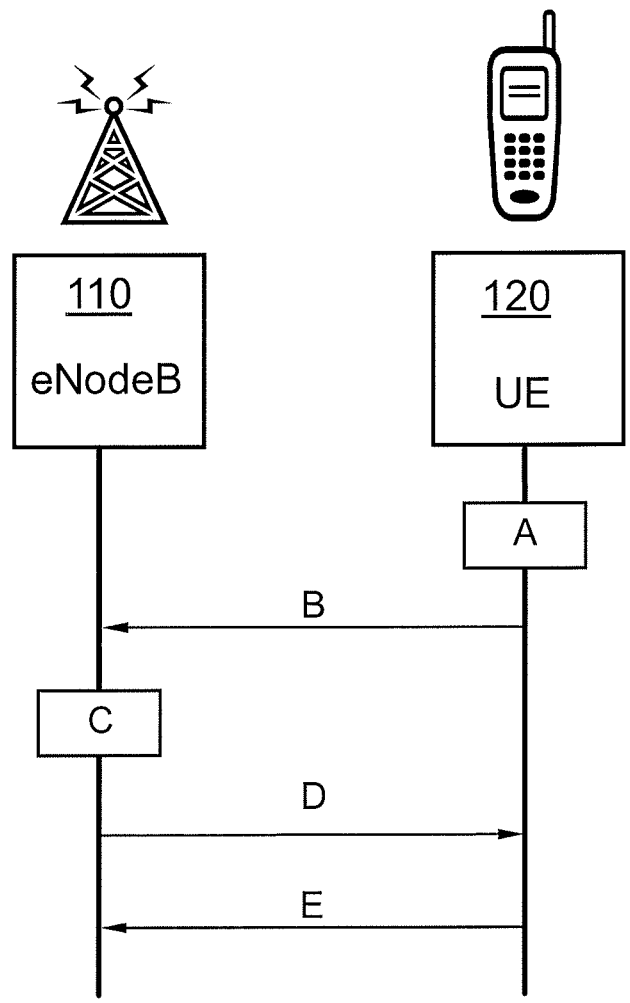
FIG. 3 is a combined flow chart and event diagram illustrating embodiments of method steps in a wireless communication system.

FIG. 3 is a combined flow chart and event diagram illustrating embodiments of method steps A-E in a wireless communication system 100.

Step A

In a first step A, the user equipment 120 acquires data to be transmitted, in the data buffer of the user equipment 120. In order to be able to transmit the data, the user equipment 120 however needs to get a grant for uplink transmission of the data to the base station 110. Also, according to the present method, further priority level information concerning the data is transmitted to the base station 110, such as e.g. the priority level of the data to be transmitted. Such additional priority level information is transmitted to the base station 110 by transmitting the scheduling requests SR only at certain scheduling request opportunities t1, t2, t3, t4, t5, such as exemplified through the examples illustrated in FIG. 2A-2C.

Thus, when the user equipment 120 has data to transmit in the buffer, the priority level of the data is determined and the transmission pattern of scheduling requests SR to be sent to the base station 110, corresponding to that transmission pattern is established.

Step B

The user equipment 120 is triggered to send the scheduling request SR to the base station 110 when data to be sent has been generated at the user equipment buffer.

The user equipment 120 has permission to send scheduling requests SR over the PUCCH i.e. at the moments of time when the base station 110 has scheduled resources on the PUCCH for sending scheduling requests SR to the base station 120.

The user equipment 120 generates and sends a sequence of scheduling requests SR to the base station 110 according to the established transmission pattern. Thereby, not only the scheduling request SR itself, comprising one bit, is transmitted but also additional priority level information related to the data to be transmitted such as e.g. priority level. The sequence of scheduling requests SR may comprise any number of scheduling requests SR, including e.g. only one or any other arbitrary number.

Step C

When receiving the sequence of scheduling requests SR, the base station 110 decodes the priority level information provided in the received sequence of scheduling requests SR and determines the additional priority level information related to the data to be scheduled. The extracted additional priority level information assists the base station scheduler in scheduling the user equipment data.

Based on the received additional information, the user equipment may be scheduled and a grant may be generated concerning the user equipment data.

Step D

The generated grant may then be transmitted to the user equipment 120, thereby scheduling the user equipment data.

Step E

When receiving the grant, the user equipment 120 is able to transmit the data in the buffer to the base station 110.

Figure 4:
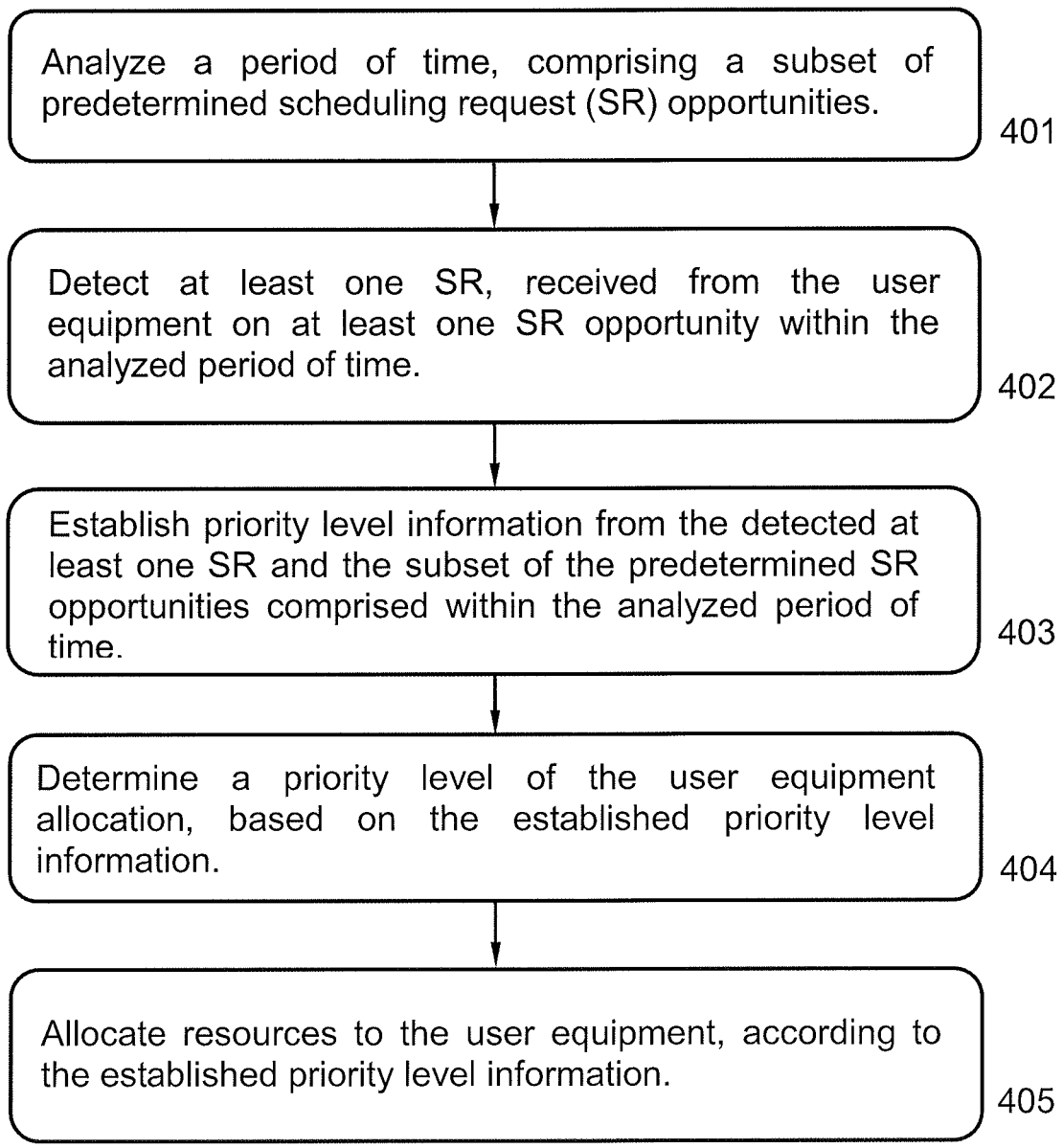
FIG. 4 is a flow chart illustrating embodiments of method steps in a wireless communication system.

FIG. 4 is a flow chart illustrating embodiments of method steps 401-405 performed in a base station 110. The method aims at allocating resources to a user equipment 120 served by the base station 110.

The user equipment 120 is configured to transmit scheduling requests SR to the base station 110 only at certain predetermined scheduling request opportunities t1, t2, t3, t4, t5. The predetermined scheduling request opportunities t1, t2, t3, t4, t5 may comprise a resource and a transmission time. The scheduling request opportunities t1, t2, t3, t4, t5 may further be divided into subgroups where each subgroup correspond to a priority level, according to some embodiments. Each subgroup may be specified by a dedicated scheduling request allocation comprising a resource and a periodicity, according to some embodiments. Further, according to some embodiments, the scheduling request opportunities t1, t2, t3, t4, t5 may be separated in time.

Further yet, according to some embodiments, different scheduling requests SR may be transmitted on different resources.

The dedicated scheduling requests SR allocations for different logical channel or logical channel group may be predefined by the base station 110 and sent to the user equipment 120 via Radio Resource Control (RRC) signalling.

The base station 110 and the user equipment 120 are comprised within a wireless communication system 100. The user equipment 120 may further comprise a buffer arranged to buffer frames comprising data.

To appropriately allocate resources to the user equipment 120, the method may comprise a number of method steps 401-405.

It is however to be noted that some of the described method steps 401-405 are optional and only comprised within some embodiments. Further, it is to be noted that the method steps 401-405 may be performed in a somewhat different chronological order other than what is indicated by the numbering. The method may comprise the following steps:

Step 401

A period of time 200, comprising a subset of the predetermined scheduling request opportunities t1, t2, t3, t4, t5, is analyzed.

The period of time 200 to be analyzed may optionally be configured such that a number of consecutive predetermined scheduling request opportunities t1, t2, t3, t4, t5 form a data word.

Step 402

At least one scheduling request SR, received from the user equipment 120 on at least one scheduling request opportunity of all the predetermined scheduling request opportunities t1, t2, t3, t4, t5 is detected within the analyzed period of time 200.

Step 403

Priority level information is established from the detected at least one scheduling request SR and the subset of the predetermined scheduling request opportunities t1, t2, t3, t4, t5, comprised within the analyzed period of time 200.

The established priority level information may comprise one or more of: logical channel group of the data to be scheduled, Quality of Service Class Identifier of the data to be scheduled, the priority level of the data to be scheduled, the priority level of the user equipment 120 or indication of amount of data to be scheduled.

To establish priority level information from the detected sequence of scheduling requests SR may comprise establishing the periodicity of the received scheduling requests SR, according to some embodiments.

The step of establishing priority level information may optionally comprise interpreting a short periodicity between a plurality of detected scheduling requests SR as high priority level of the data to be scheduled.

However, according to some embodiments, the step of establishing priority level information may alternatively comprise counting the number of received scheduling requests SR within the analyzed 401 period of time 200.

Further, according to some embodiments, the step of establishing priority level information may comprise interpreting a high number of detected scheduling requests SR within the analyzed period of time 200 as high priority level of the data to be scheduled.

However, according to some further embodiments, the step of establishing priority level information may comprise determining the priority level p of the data to be scheduled by applying modula calculation on the number of available priority level indicators n multiplied with the ordinal of the first detected scheduling request x, counted from the first after assignment according to the formula:

$$p = x \text{ modula } n.$$

According to some embodiments the detected at least one scheduling request may comprise multiple scheduling requests SR. Further, the step of establishing priority level information may comprise determining the priority level p of the data to be scheduled by counting the number of different scheduling requests SR.

The step of establishing priority level information may further comprise, according to some embodiments, interpreting the detected scheduling requests SR within the number of consecutive scheduling request opportunities t1, t2, t3, t4, t5 as binary numbers in a data word.

Step 404

This step is optional and may only be performed within some embodiments.

A priority level of the user equipment allocation may be determined, based on the established information.

Step 405

Resources are allocated to the user equipment 120, according to the established information.

Thus scheduling request resources such as which particular time slot in PUCCH to be used by the user equipment 120 when sending the data associated with the scheduling request SR is determined in this step.

Figure 5:
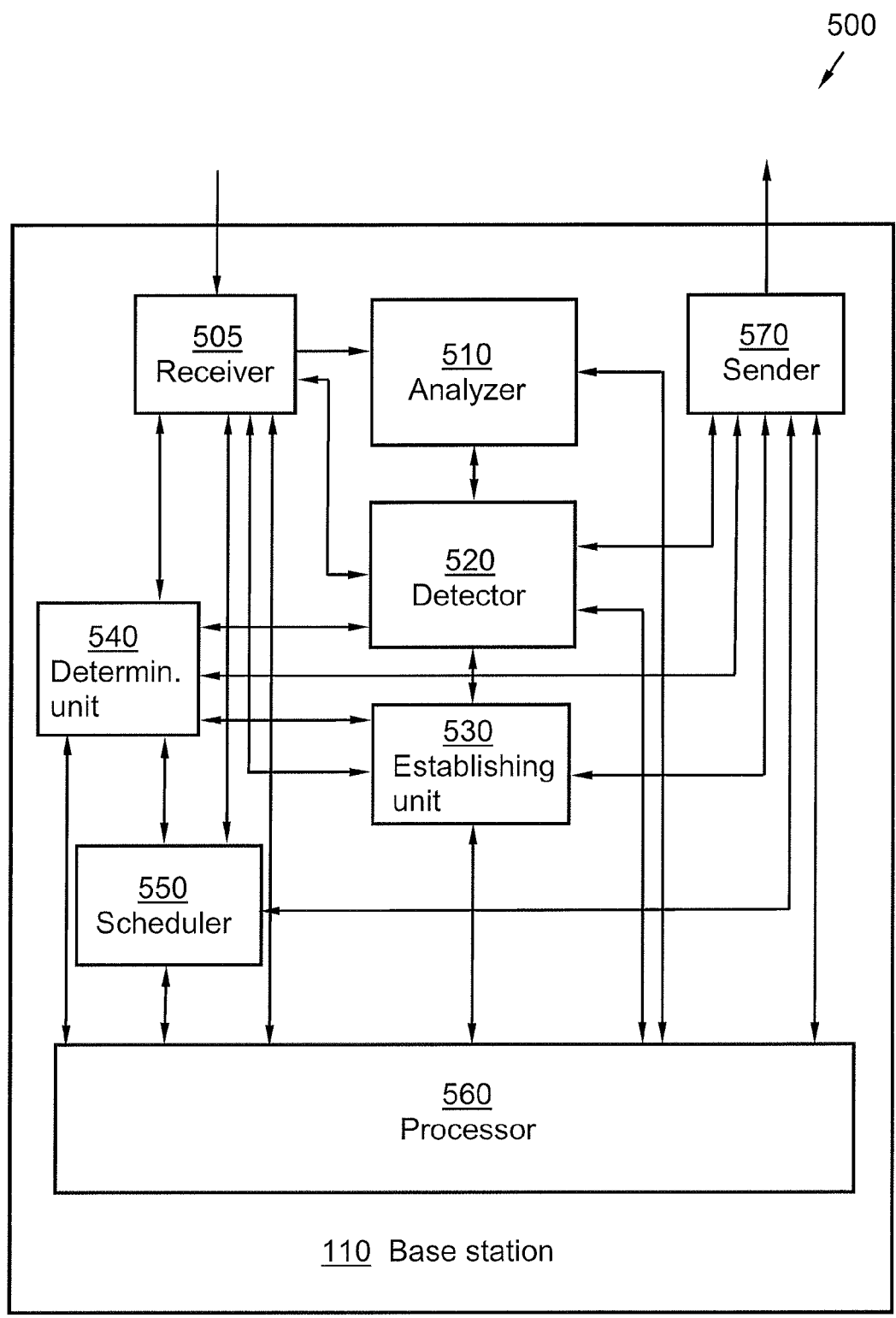
FIG. 5 is a block diagram illustrating embodiments of an arrangement in a base station.

FIG. 5 is a block diagram illustrating embodiments of an arrangement 500 situated in a base station 110. The arrangement 500 is configured to perform the method steps 401-405 for allocating resources to a user equipment 120 served by the base station 110. The base station 110 and the user equipment 120 are comprised within a wireless communication system 100.

The user equipment 120 is configured to transmit scheduling requests SR to the base station 110 only at certain predetermined scheduling request opportunities t1, t2, t3, t4, t5. The predetermined scheduling request opportunities t1, t2, t3, t4, t5 may comprise a resource and a transmission time. Different scheduling requests may be transmitted on different resources. The scheduling request opportunities t1, t2, t3, t4, t5 may be divided into subgroups where each subgroup may correspond to a priority level. Each subgroup may be specified by a dedicated scheduling request allocation comprising a resource and a periodicity, according to some embodiments. Further, optionally, the scheduling request opportunities t1, t2, t3, t4, t5 may be separated in time. The dedicated scheduling requests SR allocations for different logical channel or logical channel group may be predefined by the base station 110 and sent to the user equipment 120 via Radio Resource Control (RRC) signalling.

For the sake of clarity, any internal electronics of the arrangement 500, not completely necessary for understanding the present method has been omitted from FIG. 5.

The arrangement 500 comprises an analyzer 510. The analyzer 510 is configured to analyze a period of time 200, comprising a subset of the predetermined scheduling request opportunities t1, t2, t3, t4, t5.

The period of time 200 to be analyzed may be configured such that a number of consecutive predetermined scheduling request opportunities t1, t2, t3, t4, t5 form a data word, according to some embodiments.

Also, the arrangement 500 comprises a detector 520. The detector 520 is configured to detect at least one scheduling request SR, received from the user equipment 120 on at least one scheduling request opportunity t1, t2, t3, t4, t5 within the analyzed period of time 200.

Furthermore, in addition, the arrangement 500 comprises an establishing unit 530. The establishing unit 530 is configured to establish priority level information from the detected at least on scheduling request SR and the subset of the predetermined scheduling request opportunities t1, t2, t3, t4, t5 comprised within the analyzed period of time 200.

The establishing unit 530 may according to some embodiments be further configured to establish the periodicity of the received scheduling requests SR. Further, the establishing unit 530 may be configured to interpret a short periodicity between a plurality of detected scheduling requests SR as high priority level of the data to be scheduled.

According to some embodiments may the establishing unit 530 further be configured to count the number of received scheduling requests SR within the analyzed 401 period of time 200, and optionally to interpret a high number of detected scheduling requests SR within the analyzed 401 period of time 200 as high priority level of the data to be scheduled.

Further, the establishing unit 530 may optionally be further configured to determine the priority level p of the data to be scheduled by applying modula calculation on the number of available priority level indicators n multiplied with the ordinal of the first detected scheduling request x, counted from the first after assignment according to the formula:

$$p = x \text{ modula } n.$$

The establishing unit 530 may further be configured to determine the priority level p of the data to be scheduled by counting the number of different scheduling requests SR, wherein the detected at least one scheduling request may comprise multiple scheduling requests SR.

In addition the establishing unit 530 may optionally be further configured to interpret the detected scheduling requests SR within the number of consecutive scheduling request opportunities t1, t2, t3, t4, t5 as binary numbers in a data word, when the period of time 200 to be analyzed has been configured such that a number of consecutive predetermined scheduling request opportunities t1, t2, t3, t4, t5 form a data word.

Additionally, the arrangement 500 also comprises, further, a scheduler 550. The scheduler 550 is configured to allocate resources to the user equipment 120, according to the established information.

Further, according to some embodiments, the arrangement 500 also may comprise a determination unit 540. The optional determination unit 540 is configured to determine a priority level of the user equipment allocation, based on the established information. The established priority level information may comprise one or more of: logical channel group of the data to be scheduled, Quality of Service Class Identifier of the data to be scheduled, the priority level of the data to be scheduled, the priority level of the user equipment 120 or indication of amount of data to be scheduled.

The arrangement 500 may in further addition according to some embodiments comprise a receiver 505. The receiver 505 may be adapted to receive a scheduling request SR and/or a bearer setup message from the user equipment 120.

In further addition, the arrangement 500 also may comprise an optional sending unit 570. The sending unit 570 may be adapted to send an instruction comprising the allocated scheduling request resource to the user equipment 120, in order to schedule the data transmission of the user equipment 120, according to some embodiments.

The arrangement 500 may also according to some embodiments further comprise a processor 560. The processor 560 may be represented by e.g. a Central Processing Unit (CPU), a processing unit, a microprocessor, or other processing logic that may interpret and execute instructions. The processor 560 may perform any, some or all data processing functions for inputting, outputting and processing of data comprising e.g. data buffering and device control functions, such as call processing control, user interface control, or the like just to exemplify with some arbitrary examples.

It is to be noted that the described units 505-570 comprised within the arrangement 500 may be regarded as separate logical entities, but not with necessity as separate physical entities. Any, some or all of the units 505-570 may be comprised or co-arranged within the same physical unit. However, in order to facilitate the understanding of the functionality of the arrangement 500, the comprised units 505-570 are illustrated as separate units in FIG. 5.

Thus the sending unit 570 and e.g. the receiving unit 505 may, according to some embodiments, be comprised within one physical unit, a transceiver, which may comprise a transmitter circuit and a receiver circuit, which respectively transmits outgoing radio frequency signals to base station 110 and receives incoming radio frequency signals from the user equipment 120 via an optional antenna. The antenna may be an embedded antenna, a retractable antenna or any other arbitrary antenna without departing from the scope of the present arrangements. The radio frequency signals transmitted between the base station 110 and the user equipment 120 may comprise both traffic and control signals e.g., paging signals/messages for incoming calls, which may be used to establish and maintain a voice call communication with another party or to transmit and/or receive data, such as SMS, e-mail or MMS messages, etc.

Particular Embodiments within in the Base Station 110

The method steps 401-405 in the base station 110 may be implemented through one or more processors 560 in the base station 110, together with computer program code for performing at least some of the functions comprised within the present method steps 401-405. Thus a computer program product, comprising instructions such as computer program code, for performing the method steps 401-405 in the base station 110 may allocate resources to the user equipment 120 served by the base station 110.

The computer program product mentioned above, which is a tangible and physical product, may be provided for instance in the form of a physical data carrier carrying computer program code for performing the method steps according to the present solution when being loaded into the processor unit 580. The data carrier may be e.g. a hard disk, a CD ROM disc, a memory stick, an optical storage device, a magnetic storage device or any other appropriate medium such as a disk or tape that can hold machine readable data. The computer program code can furthermore be provided as program code stored on a server and downloaded to the base station 110 remotely, e.g. over an Internet or an intranet connection.

Further, the computer program product comprising instructions for performing at least some of the method steps 401-405 may be used for implementing the previously described method in the base station 110 for allocating resources to the user equipment 120, when the computer program product is run on the processor 580 comprised within the base station 110.

Figure 6:
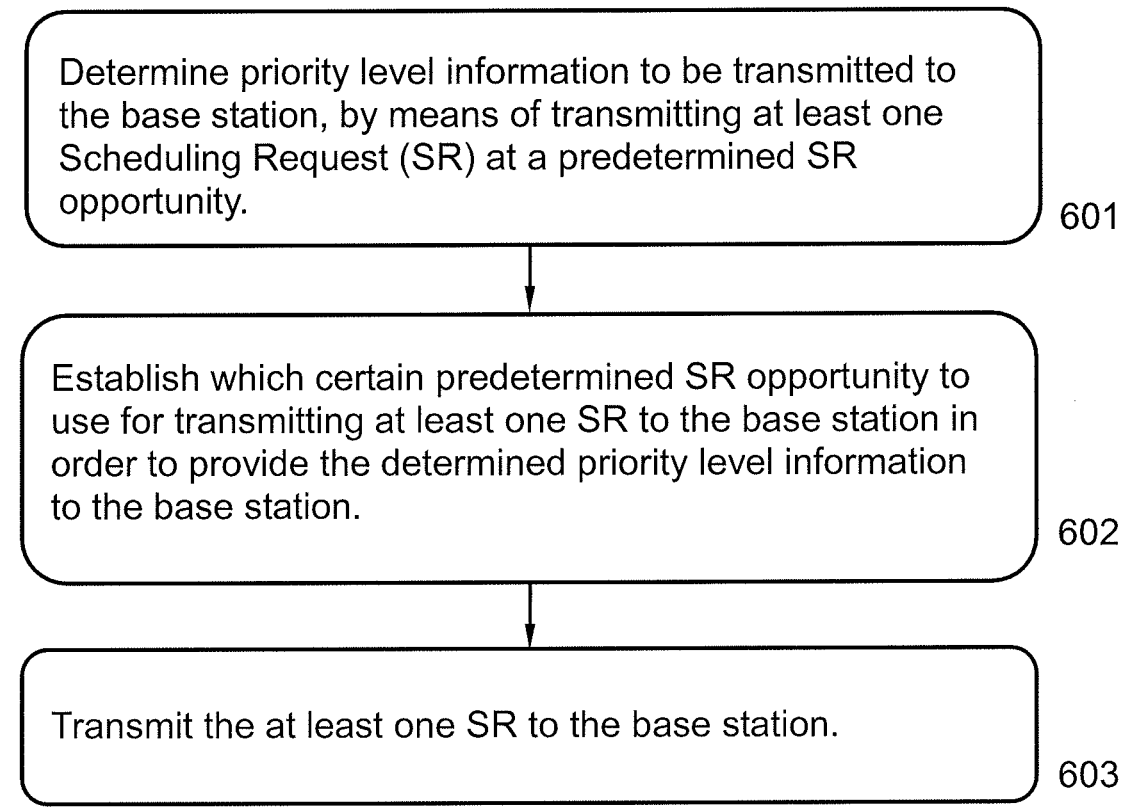
FIG. 6 is a flow chart illustrating embodiments of method steps in a user equipment.

FIG. 6 is a flow chart illustrating embodiments of method steps 601-603 performed in a user equipment 120. The method aims at assisting a base station 110 in allocating resources to the user equipment 120. The base station 110 and the user equipment 120 are comprised within a wireless communication system 100. The user equipment 120 is configured to transmit scheduling requests SR to the base station 110 only at certain predetermined scheduling request opportunities t1, t2, t3, t4, t5.

To appropriately assist the base station 110 in allocating resources to the user equipment 120, the method may comprise a number of method steps 601-603.

It is however to be noted that the method steps 601-603 may be performed in a somewhat different chronological order and that some of them, e.g. step 601 and step 602, or even all steps may be performed simultaneously or in a different chronological order. The method comprises the following steps:

Step 601

It is determined which priority level information to be transmitted to the base station 110, by means of transmitting at least one scheduling request SR at a certain predetermined scheduling request opportunity t1, t2, t3, t4, t5.

The priority level information to be transmitted to the base station 110 may comprise any of: logical channel group of the data to be scheduled, Quality of Service Class Identifier of the data to be scheduled, the priority level of the data to be scheduled, the priority level of the user equipment 120 or indication of amount of data to be scheduled, according to some embodiments.

Step 602

It is established which certain predetermined scheduling request opportunity t1, t2, t3, t4, t5 to use for transmitting at least one scheduling request SR to the base station 110 in order to provide the determined priority level information to the base station 110.

Thus the priority level information may be encoded in a sequence of scheduling requests SR, transmitted to the base station 110 at an established periodicity at the predetermined scheduling request opportunities t1, t2, t3, t4, t5.

Thus, according to some embodiments, a short periodicity between a plurality of transmitted scheduling requests SR may indicate a high priority level of the data to be scheduled.

However, according to some embodiments, the number of transmitted scheduling requests SR within a certain period of time may indicate the priority level information to be transmitted to the base station 110.

A high number of transmitted scheduling requests SR within the certain period of time may indicate high priority level of the data to be scheduled, according to some embodiments.

Further, the selection of which scheduling request opportunity/ies t1, t2, t3, t4, t5 to use for transmitting at least one scheduling request SR to the base station 110 may optionally be performed by applying modula calculation on the number of available priority level indicators (n) multiplied with the ordinal of the first transmitted scheduling request (x), counted from the first after assignment according to the formula:

$$p = x \text{ modula } n.$$

The at least one scheduling request SR may optionally comprise multiple scheduling requests SR and priority level information, related to the priority level p of the data to be scheduled may be transmitted to the base station 120 by transmitting a number of different scheduling requests SR.

However, according to some embodiments, a number of consecutive predetermined scheduling request opportunities t1, t2, t3, t4, t5 may form a data word.

The scheduling requests SR transmitted within those consecutive scheduling request opportunities t1, t2, t3, t4, t5 may represent "1" and the lack of scheduling request SR at a certain scheduling request opportunity t1, t2, t3, t4, t5 may represent "0". Priority level information may thereby be transmitted to the base station 110 by interpreting the number of consecutive predetermined scheduling request opportunities t1, t2, t3, t4, t5 as a data word comprising binary digits.

Step 603

The at least one scheduling request SR is transmitted to the base station 110.

The transmitted scheduling request SR may be comprised in a predetermined sequence of scheduling requests SR, transmitted to the base station 120 in a determined pattern at the certain predetermined scheduling request opportunities t1, t2, t3, t4, t5. The scheduling request SR may be sent over a control channel, such as e.g. PUCCH.

Figure 7:
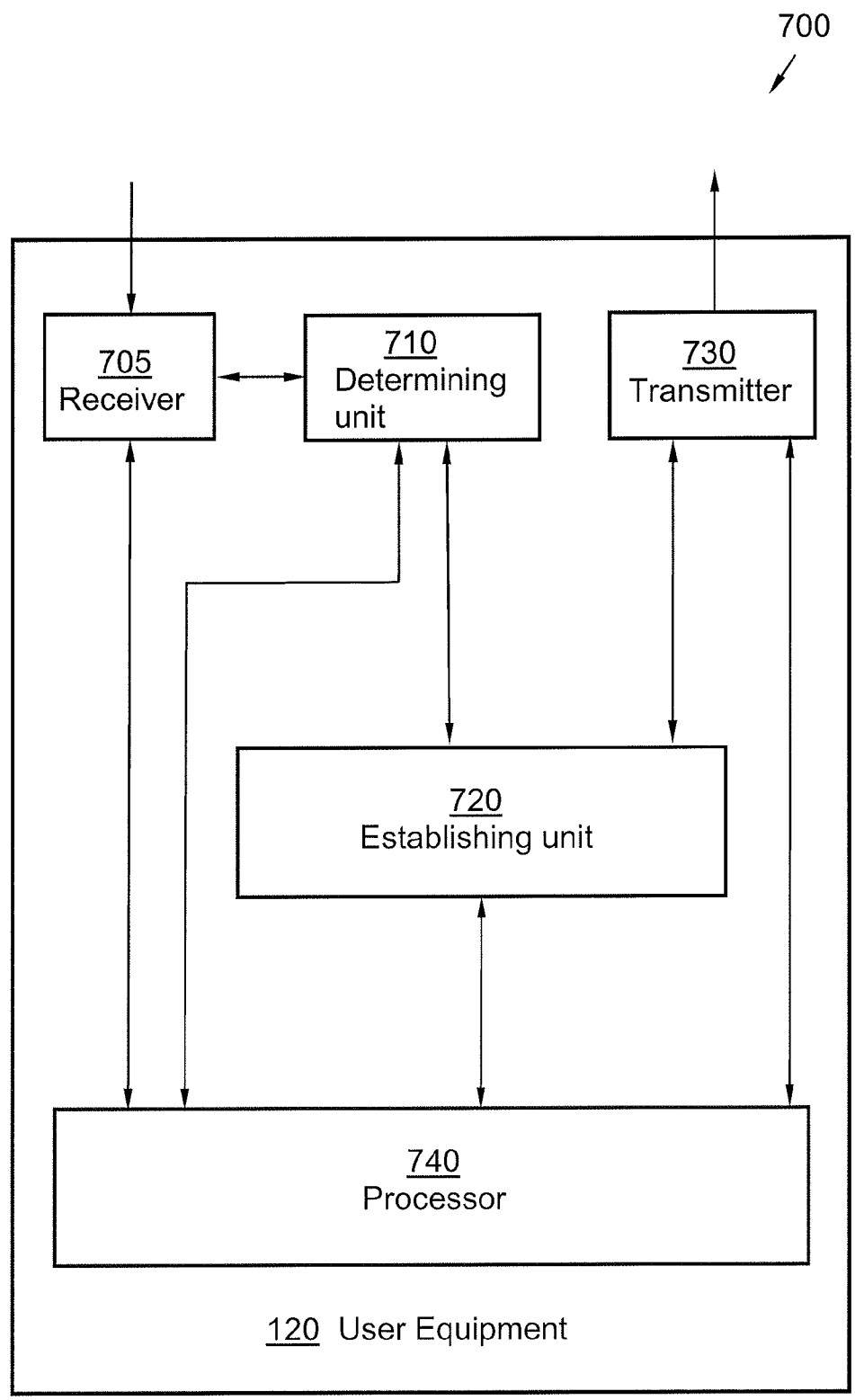
FIG. 7 is a block diagram illustrating embodiments of an arrangement in a user equipment.

FIG. 7 is a block diagram illustrating embodiments of an arrangement 700 situated in a user equipment 120. The arrangement 700 is configured to transmit scheduling requests SR to the base station 110 only at certain predetermined scheduling request opportunities t1, t2, t3, t4, t5. Thereby is the arrangement 700 adapted to perform at least some of the method steps 601-603 for assisting the base station 110 in allocating resources to the user equipment 120. The base station 110 and the user equipment 120 are comprised within a wireless communication system 100.

For the sake of clarity, any internal electronics of the arrangement 700, not completely necessary for understanding the present method has been omitted from FIG. 7.

The arrangement 700 comprises a determining unit 710. The determining unit 710 is adapted to determine priority level information to be transmitted to the base station 110, by means of transmitting at least one scheduling request SR at a certain predetermined scheduling request opportunity t1, t2, t3, t4, t5.

Also, the arrangement 700 comprises an establishing unit 720. The establishing unit 720 is configured to establish which certain predetermined scheduling request opportunity t1, t2, t3, t4, t5 to use for transmitting at least one scheduling request SR to the base station 110 in order to provide the determined priority level information to the base station.

Furthermore, the arrangement 700 also comprises a transmitter 730. The transmitter 730 is configured to transmit the at least one scheduling request SR to the base station 110.

According to some embodiments may the arrangement 700 further comprise a receiver 705. The receiver 705 is configured to receive signals from the base station 110.

The arrangement 700 may according to some embodiments further comprise a processor 740. The processor 740 may be represented by e.g. a Central Processing Unit (CPU), a processing unit, a microprocessor, or other processing logic that may interpret and execute instructions. The processor 740 may perform all data processing functions for inputting, outputting, and processing of data including data buffering and device control functions, such as call processing control, user interface control, or the like.

It is to be noted that the described units 705-740 comprised within the arrangement 700 may be regarded as separate logical entities, but not with necessity as separate physical entities. Any, some or all of the units 705-740 may be comprised or co-arranged within the same physical unit. However, in order to facilitate the understanding of the functionality of the arrangement 700, the comprised units 705-740 are illustrated as separate units in FIG. 7.

Thus the transmitter 730 and e.g. the receiver 705 may, according to some embodiments, be comprised within one physical unit, a transceiver, which may comprise a transmitter circuit and a receiver circuit, which respectively transmits outgoing radio frequency signals and receives incoming radio frequency signals via an optional antenna. The antenna may be an embedded antenna, a retractable antenna or any other arbitrary antenna without departing from the scope of the present arrangements. The radio frequency signals transmitted between the base station 110 and the user equipment 120 may comprise both traffic and control signals e.g., paging signals/messages for incoming calls, which may be used to establish and maintain a voice call communication with another party or to transmit and/or receive data, such as SMS, e-mail or MMS messages, etc.

Particular Embodiment of the Present Method in the User Equipment 120

The method steps 601-603 in the user equipment 120 may be implemented through one or more processors 740 in the user equipment 120, together with computer program code for performing any, some or all the functions of the present method steps 601-603. Thus a computer program product, comprising instructions for performing the method steps 601-603 in the user equipment 120 may assist the base station 110 in allocating resources to the user equipment 120, according to some embodiments.

The computer program product mentioned above, which is a physical and tangible computer program product, may be provided for instance in the form of a physical data carrier carrying computer program code for performing the method steps according to the present solution when being loaded into the processor 740. The data carrier may be e.g. a hard disk, a CD ROM disc, a memory stick, an optical storage device, a magnetic storage device or any other appropriate physical and tangible medium such as a disk or tape that can hold machine readable data. The computer program code can furthermore be provided as program code stored on a server and downloaded to the user equipment 120 remotely, e.g. over an Internet or an intranet connection.

Further, the computer program product comprising instructions for performing at least some of the method steps 601-603 may be used for implementing the previously described method in the user equipment 120 for assisting the base station 110 in allocating resources to the user equipment 120, when the computer program product is run on the processor 740 comprised within the user equipment 120.

The terminology used in the detailed description of the particular exemplary embodiments illustrated in the accompanying drawings is not intended to be limiting of the present methods and arrangements.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

The invention claimed is:

1. A method in a base station for allocating resources to a user equipment served by the base station, the user equipment being configured to transmit scheduling requests (SR) to the base station only at certain predetermined scheduling request opportunities, the method comprising:
analyzing a period of time comprising a subset of the predetermined scheduling request opportunities;
detecting at least one scheduling request (SR), received from the user equipment on at least one scheduling request opportunity within the analyzed period of time;
establishing priority level information from the detected at least one scheduling request (SR) and the subset of the predetermined scheduling request opportunities, wherein establishing the priority level information comprises establishing periodicity of the received scheduling requests (SR) and interpreting a short periodicity between a plurality of detected scheduling requests (SR) as a high priority level of the data to be scheduled; and
allocating resources to the user equipment according to the established priority level information.

2. The method according to claim 1, comprising the further step of:
determining a priority level for the allocation of resources to the user equipment, based on the established priority level information,
wherein the established priority level information comprises one or more of: logical channel group of the data to be scheduled, Quality of Service Class Identifier of the data to be scheduled, the priority level of the data to be scheduled, the priority level of the user equipment, or indication of amount of data to be scheduled.

3. The method according to claim 1, wherein:
the predetermined scheduling request opportunities comprises a resource and a transmission time; and
different scheduling requests (SR) are transmitted by the user equipment on different resources.

4. The method according to claim 1, wherein:
the step of establishing priority level information further comprises counting the number of received scheduling requests (SR) within the analyzed period of time, and
interpreting a high number of detected scheduling requests (SR) within the analyzed period of time as the high priority level of the data to be scheduled.

5. The method according to claim 4, wherein the scheduling request opportunities are divided into subgroups where each subgroup corresponds to a priority level.

6. The method according to claim 1, wherein the scheduling request opportunities are separated in time and wherein the step of establishing priority level information comprises determining the priority level, p, of the data to be scheduled by applying modula calculation on the number of available priority level indicators, n multiplied with the ordinal of the first detected scheduling request, x, counted from the first after assignment according to the formula:

$$p = x \text{ modula } n.$$

7. The method according to claim 5, wherein each subgroup is specified by a dedicated scheduling request allocation comprising a resource and a periodicity.

8. The method according to claim 1, wherein the detected at least one scheduling request comprises multiple scheduling requests (SR) and wherein the step of establishing priority level information comprises determining the priority level, p of the data to be scheduled by counting the number of different scheduling requests (SR).

9. The method according to claim 1, wherein the period of time to be analyzed is configured such that a number of consecutive predetermined scheduling request opportunities form a data word, and wherein the step of establishing priority level information comprises interpreting the detected scheduling requests (SR) within the number of consecutive scheduling request opportunities as binary numbers in a data word.

10. The method according to claim 1, wherein dedicated scheduling requests (SR) allocations for different logical channel or logical channel group are predefined by the base station and sent to the user equipment via Radio Resource Control signalling.

11. An arrangement in a base station for allocating resources to a user equipment served by the base station, the user equipment being configured to transmit scheduling requests (SR) to the base station only at certain predetermined scheduling request opportunities, the arrangement comprising a processor configured to:
analyze a period of time comprising a subset of the predetermined scheduling request opportunities;
detect at least one scheduling request (SR), received from the user equipment on at least one scheduling request opportunity within the analyzed period of time;

establish priority level information from the detected at least on scheduling request (SR) and the subset of the predetermined scheduling request opportunities comprised within the analyzed period of time, and establish the priority level information by establishing periodicity of the received scheduling requests (SR), and interpreting a short periodicity between a plurality of detected scheduling requests (SR) as a high priority level of the data to be scheduled; and allocate resources to the user equipment according to the established priority level information.

12. The arrangement according to claim 11, wherein the processor is further configured to:

determine a priority level for the allocation of resources to the user equipment, based on the established priority level information, wherein the established priority level information comprises one or more of: logical channel group of the data to be scheduled, Quality of Service Class Identifier of the data to be scheduled, the priority level of the data to be scheduled, the priority level of the user equipment, or indication of amount of data to be scheduled.

13. The arrangement according to claim 11, wherein:

the predetermined scheduling request opportunities comprises a resource and a transmission time and different scheduling requests (SR) are transmitted on different resources.

14. The arrangement according to claim 11, wherein the processor is further configured to count the number of received scheduling requests (SR) within the analyzed period of time, and to interpret a high number of detected scheduling requests (SR) within the analyzed period of time as the high priority level of the data to be scheduled.

15. The arrangement according to claim 11, wherein the scheduling request opportunities are divided into subgroups where each subgroup corresponds to a priority level.

16. The arrangement according to claim 11, wherein the scheduling request opportunities are separated in time and wherein the processor is further configured to determine the priority level, p, of the data to be scheduled by applying modula calculation on the number of available priority level indicators, n, multiplied with the ordinal of the first detected scheduling request, x, counted from the first after assignment according to the formula:

$$p = x \text{ modula } n.$$

17. The arrangement according to claim 15, wherein each subgroup is specified by a dedicated scheduling request allocation comprising a resource and a periodicity.

18. The arrangement according to claim 11, wherein the detected at least one scheduling request comprises multiple scheduling requests (SR) and wherein the processor is further configured to determine the priority level, p, of the data to be scheduled by counting the number of different scheduling requests (SR).

19. The arrangement according to claim 11, wherein the period of time to be analyzed is configured such that a number of consecutive predetermined scheduling request opportunities form a data word, and wherein the processor is further configured to interpret the detected scheduling requests (SR) within the number of consecutive scheduling request opportunities as binary numbers in a data word.

20. The arrangement according to claim 11, wherein dedicated scheduling requests (SR) allocations for different logical channel or logical channel group are predefined by the base station and sent to the user equipment via Radio Resource Control signalling.

21. A method in a user equipment for assisting a base station in allocating resources to the user equipment, the user equipment being configured to transmit scheduling requests (SR) to the base station only at certain predetermined scheduling request opportunities, the method comprising:

determining priority level information to be transmitted to the base station by transmission of at least one scheduling request (SR) at a certain predetermined scheduling request opportunity;

establishing which certain predetermined scheduling request opportunity to use for transmitting at least one scheduling request (SR) to the base station to provide the determined priority level information to the base station, and further determine the priority level information by establishing periodicity of the scheduling requests (SR) to be transmitted, wherein a short periodicity between a plurality of scheduling requests (SR) is interpreted as a high priority level of the data to be scheduled; and transmitting the at least one scheduling request (SR) to the base station.

22. The method according to claim 21, wherein the priority level information to be transmitted comprises one or more of: logical channel group of the data to be scheduled, Quality of Service Class Identifier of the data to be scheduled, the priority level of the data to be scheduled, the priority level of the user equipment, or indication of amount of data to be scheduled.

23. An arrangement in a user equipment for assisting a base station in allocating resources to the user equipment, the user equipment being configured to transmit scheduling requests (SR) to the base station only at certain predetermined scheduling request opportunities, the arrangement comprising a processor configured to:

determine priority level information to be transmitted to the base station by transmission of at least one scheduling request (SR) at a certain predetermined scheduling request opportunity;

establish which certain predetermined scheduling request opportunity to use for transmitting at least one scheduling request (SR) to the base station to provide the determined priority level information to the base station, and also configured to determine the priority level information by establishing periodicity of the scheduling requests (SR) to be transmitted, wherein a short periodicity between a plurality of scheduling requests (SR) is interpreted as a high priority level of the data to be scheduled; and transmit, via a transmitter, the at least one scheduling request (SR) to the base station.

* * * * *

UNITED STATES PATENT AND TRADEMARK OFFICE
CERTIFICATE OF CORRECTION

PATENT NO.         : 8,923,271 B2                                    Page 1 of 1
APPLICATION NO.    : 13/519061
DATED              : December 30, 2014
INVENTOR(S)        : Wang et al.

It is certified that error appears in the above-identified patent and that said Letters Patent is hereby corrected as shown below:

In the Specification,

In Column 10, Lines 9-10, delete "station 120." and insert -- station 110. --, therefor.

In Column 15, Line 43, delete "station 120" and insert -- station 110 --, therefor.

In Column 15, Line 61, delete "station 120" and insert -- station 110 --, therefor.

In the Claims,

In Column 18, Line 31, in Claim 6, delete "n" and insert -- n, --, therefor.

In Column 19, Line 25, in Claim 13, delete "time" and insert -- time, --, therefor.

Signed and Sealed this
Seventh Day of July, 2015

Michelle K. Lee
*Director of the United States Patent and Trademark Office*